United States Patent
Toulemont et al.

(10) Patent No.: US 9,211,767 B2
(45) Date of Patent: Dec. 15, 2015

(54) TREAD WITH INCISIONS

(75) Inventors: Pierric Toulemont, Roanne (FR); Patrice Fraysse, Blanzat (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1045 days.

(21) Appl. No.: 13/132,909

(22) PCT Filed: Dec. 2, 2009
(Under 37 CFR 1.47)

(86) PCT No.: PCT/EP2009/066214
§ 371 (c)(1),
(2), (4) Date: Jan. 27, 2012

(87) PCT Pub. No.: WO2010/063751
PCT Pub. Date: Jun. 10, 2010

(65) Prior Publication Data
US 2012/0132337 A1    May 31, 2012

(30) Foreign Application Priority Data
Dec. 5, 2008   (FR) ...................................... 08 58295

(51) Int. Cl.
*B60C 11/12*   (2006.01)

(52) U.S. Cl.
CPC .............. *B60C 11/12* (2013.01); *B60C 11/124* (2013.04); *B60C 11/1218* (2013.04); *B60C 11/1281* (2013.04); *B60C 2011/1209* (2013.04)

(58) Field of Classification Search
CPC  B60C 11/12; B60C 11/1204; B60C 11/1218; B60C 11/124; B60C 11/1272; B60C 2011/1277; B60C 11/1281

USPC .............. 152/209.18, 209.23, 209.24, 209.25
See application file for complete search history.

(56) References Cited

U.S. PATENT DOCUMENTS

| | | | |
|---|---|---|---|
| 4,794,965 A * | 1/1989 | Lagnier | 152/209.24 |
| 2002/0017349 A1 | 2/2002 | Lopez | |
| 2002/0166613 A1 | 11/2002 | Radulescu | |
| 2005/0150581 A1 | 7/2005 | Kishida | |

(Continued)

FOREIGN PATENT DOCUMENTS

| EP | 0 846 578 A2 | | 6/1998 |
|---|---|---|---|
| EP | 0846578 | * | 6/1998 |

(Continued)

OTHER PUBLICATIONS

International Search Report mailed Mar. 4, 2010 for International Patent Application No. PCT/EP2009/066214.

*Primary Examiner* — Eric Hug
(74) *Attorney, Agent, or Firm* — Dickinson Wright PLLC

(57) ABSTRACT

A tread for passenger-vehicle tire having radially on the outside a running surface and comprising a plurality of elements, at least certain of these elements being provided with at least one incision delimited by two opposite faces, this incision consisting of a succession of thin sections and of thick sections placed in an alternating manner, the thin sections being inclined at an angle A equal to no more than 40 degrees, this angle being measured relative to a direction perpendicular to the running surface of the tread and passing through the points of the incision on the running surface of the tread, the thick sections forming an angle B of between 60 degrees and 120 degrees with a direction perpendicular to the running surface of the tread, and the thin sections having a width e less than the width E of the thick sections, the width of the thin sections being such that, when they go through the contact patch, the walls delimiting said thin sections are in contact, and the width of the thick sections being such that, when they go through the contact patch, the walls delimiting the thick sections are not in contact.

6 Claims, 2 Drawing Sheets

(56) References Cited

U.S. PATENT DOCUMENTS

2009/0000713 A1 * 1/2009 Stuhldreher ............ 152/209.24

FOREIGN PATENT DOCUMENTS

| | | | |
|---|---|---|---|
| EP | 1 170 153 A1 | | 1/2002 |
| EP | 1 555 142 A2 | | 7/2005 |
| EP | 2138330 | * | 12/2009 |
| JP | 10-181315 | * | 7/1998 |
| JP | 11-151915 A | | 6/1999 |
| JP | 2002-316517 A | | 10/2002 |
| JP | 2005-219638 A | | 8/2005 |
| WO | WO 94/21478 | * | 9/1994 |

* cited by examiner

TREAD WITH INCISIONS

The invention relates to tire treads and more particularly to the incisions with which such treads are provided.

In order to achieve a satisfactory performance on a wet road surface, it is known practice to provide a tire tread, having a running surface designed to be in contact with the road surface when running, with a plurality of grooves of generally circumferential and transverse orientation. These grooves have widths of more than 2 mm for passenger-vehicle tires and allow drainage of the water that is present on the road surface in rainy weather.

These grooves delimit elements of rubbery material in the form of ribs and/or of blocks, these elements being delimited on the running surface by edges useful for ensuring a good contact with the road surface.

In order to increase the number of edges in contact with the road surface, it is known practice to provide the elements of the tread with a plurality of incisions, that is to say with thin cutouts which, while removing a small and even zero quantity of material, create opposite faces of which the intersections with the running surface form edges. By definition, these incisions have average widths that are smaller than those of the grooves (that is to say less than 2 mm and more frequently less than 1 mm). Under the forces exerted by the ground on the tread, the incisions tend to close until the opposite faces come into contact.

This increase in the number of incisions leads in certain stresses to a reduction in the rigidity of the tread in reaction to stresses exerted by the road surface when running.

In order to limit the reduction in rigidity associated with the presence of these thin cutouts, it is known practice to make opposite faces having zigzag geometries in one or more different directions in order to make one face mesh with the opposite face.

Document JP11-151915 describes an incision the line of which in the thickness of the tread comprises a succession of sections perpendicular to the running surface and of sections parallel to the running surface. The perpendicular sections have widths such that contact is not possible between the faces of the incision on these sections. Under a braking force, the rigidity of the tread elements provided with such incisions is reduced by the presence of sections perpendicular to the running surface since there is no possibility of contact between the walls of these sections. On the other hand, the parallel sections have a width appropriate for contact between the faces of the incision and these sections.

These spaces formed by the perpendicular sections play the role of a reservoir for temporarily clearing away the water that might be present on the road surface in rainy weather and over which the tread passes.

It is however known practice to incline in one and the same direction all the incisions of a tread, these incisions forming an average angle of inclination, and even average angles of inclination that differ in absolute value depending on the area of the tread in question. The incisions have small widths (that is to say less than 2 mm) in order to limit the reduction in rigidity as much as possible, notably in compression when the element provided with an incision comes into contact with the road surface.

In such a configuration, the load applied to the tire causes the walls delimiting the incisions to come together irrespective of any driving or braking force exerted by the road surface on the tread. This coming together can result in a contact between the faces, which increases the rigidity of the elements of the tread.

The objective of the invention is to form a tread in which the elements in relief forming the sculpture designed to come into contact with the road surface have an operation that is appropriate and differentiated depending on the amplitude of the forces exerted by the road surface on said tread, whether these forces be driving or braking forces.

"Braking force" means a force exerted by the ground on the tread and oriented in a direction opposite to the direction of movement of the tire provided with said tread. "Driving force" means a force exerted by the ground on the tread and oriented in the direction of movement of the tire provided with said tread.

The proposal is for a tread for a passenger-vehicle tire, this tread having radially on the outside a running surface designed to come into contact with the road surface when running and comprising a plurality of elements delimited by cutouts (these elements may be ribs or blocks). At least certain of these elements are provided with at least one incision delimited by two opposite faces, this incision consisting of a succession of thin sections and of thick sections placed in an alternating manner (a thin section is followed by a thick section).

The tread according to the invention is such that each thin section is inclined at an average angle A equal to no more than 40 degrees, this angle being measured relative to a direction perpendicular to the running surface of the tread and passing through the points of the incision on the running surface of the tread, and each thick section makes an average angle B of between 60 degrees and 120 degrees with a direction perpendicular to the running surface of the tread. Moreover, the thin sections have an average width smaller than the average width of the thick sections, the width of the thin sections being such that, when they go through the contact patch, the walls delimiting said thin sections are in contact, the width of the thick sections being such that, when they go through the contact patch, the walls delimiting the thick sections are not in contact.

For this solution to be fully effective, it is preferable that the thin sections are closed when going through the contact patch with the road surface. "Closed" means that the walls delimiting a thin section are in contact with one another virtually simply by the action of the supported load. By virtue of the alternation of thin sections and thick sections, the latter being oriented so as to be substantially parallel to the running surface (that is to say perpendicular to a plane passing through the rotation axis and the points of the incision innermost in the tread), it is possible to create a threshold effect. "Threshold effect" in this instance means that up to a threshold of amplitude of tangential force of the road surface on the tread, the opposite walls of the incision are in contact on the thin sections and remain fixed relative to one another: everything happens as if the rigidity of the element were equivalent to that of the same element with no incision. Beyond this threshold of amplitude of tangential force, the walls in contact can slide relative to one another both because the friction forces are overcome and because there is a possibility of relative movement associated with the presence of thick sections.

Preferably, the thin sections of incision have a width equal to no more than 0.4 mm and the thick sections of incision have a width of more than 0.4 mm, the difference between the widths of the thin sections and of the thick sections being at least equal to 0.2 mm.

Yet more advantageously, the thin sections of incision have a width equal to no more than 0.15 mm and the thick sections of incision have a width of more than 0.4 mm.

The present incision differs from the incisions of the prior art since the latter did not have any differentiation in mechanical behavior as a function of the amplitude of the force exerted by the road surface on the tread, whether this force was a driving force or a braking force.

By virtue of the differences in widths between the thin sections and the thick sections and of their orientations as specified, the braking-maneuver performance of the tread is improved. Thus it is possible to adapt the rigidity of each element provided with incisions as described since, at low braking forces (forces exerted by the road surface on the tread and tending to run counter to the movement), the friction forces of the walls in contact are sufficient to keep said walls closed off, while, at higher braking forces, the friction forces of the walls in contact with one another are insufficient to resist the sliding of one wall relative to the other. In the latter case, a sliding occurs that is possible and yet limited in amplitude by the width of the thick sections of incision. This differentiated behavior as a function of the amplitude of the braking force is of particular value since low braking or driving forces are notably those that operate in the wearing mechanisms while the higher braking forces operate when running in wet road-surface conditions. In the latter case (high braking forces), the attempt is to ensure that the element of material can deform more in order to improve the braking performance on water-covered road surfaces.

In a particularly valuable variant of the invention, it is proposed to orient the incisions so that, when the tread is subjected to an average driving force exerted by the road surface, the thin sections of the incisions tend to remain firmly in contact, which is advantageous in reducing wear under driving force.

For this purpose, a tread is proposed that comprises an indicator of the imposed running direction, this tread having at least one incision comprising at least one thin section and one thick section, the thin sections being inclined so that, seen in section in a plane perpendicular to the rotation axis of the tire, the direction of the indicator of the imposed running direction is identical to the rotation direction in which said section of incision must be made to rotate, about its innermost point of the tread, in order to bring this section into a plane containing the rotation axis, each thin section being inclined at an average angle A at least equal to 20 degrees and equal to no more than 40 degrees with a direction perpendicular to the running surface.

Therefore, a threshold effect is obtained as a function of the amplitude of the braking force exerted by the ground on the tread and also the orientation chosen in combination with the direction of travel of the tire provided with said tread makes it possible to optimize the operation of this tread notably under driving force.

Other features and advantages of the invention will emerge from the description made below with reference to the appended drawings which show, as non-limiting examples, embodiments of the subject of the invention.

All the figures accompanying the present description are given as an indication and the dimensions, whether they be absolute or relative, are only indicative; moreover, one and the same structural element will be marked by the same reference number on figures showing different variants of the invention.

A tread for a tire is limited by external surfaces one of which is designed to be in contact with a tire structure and another is designed to be in contact with the road surface being used; the direction substantially perpendicular to these two surfaces is called the radial direction on the tire. In this direction the thickness of the tread is measured.

Figure 1:
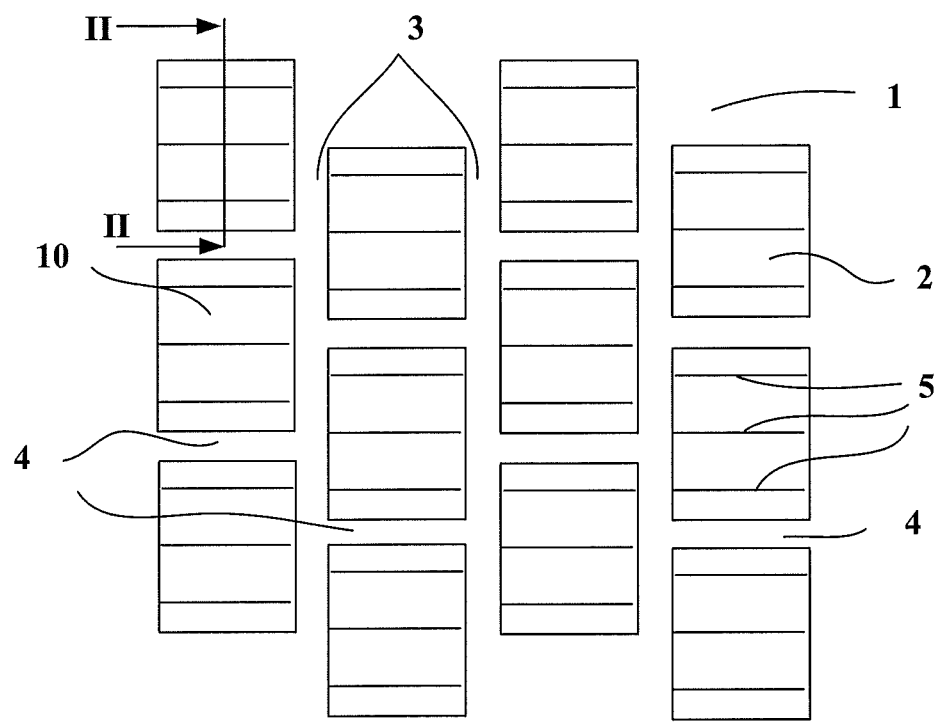
FIG. 1 shows a plan view of a tread comprising elements provided with incisions according to the invention.

FIG. 1 shows a plan view of a portion of a tread 1 comprising a plurality of relief elements (blocks) 2 delimited by grooves 3 of longitudinal orientation (that is to say circumferential on the tire provided with said tread) and grooves 4 of transverse orientation. Moreover, these relief elements 2 are each provided with several incisions 5 according to the invention, these incisions cutting the running surface 10 creating two edges that are useful for improving the contact and grip performance.

Figure 2:
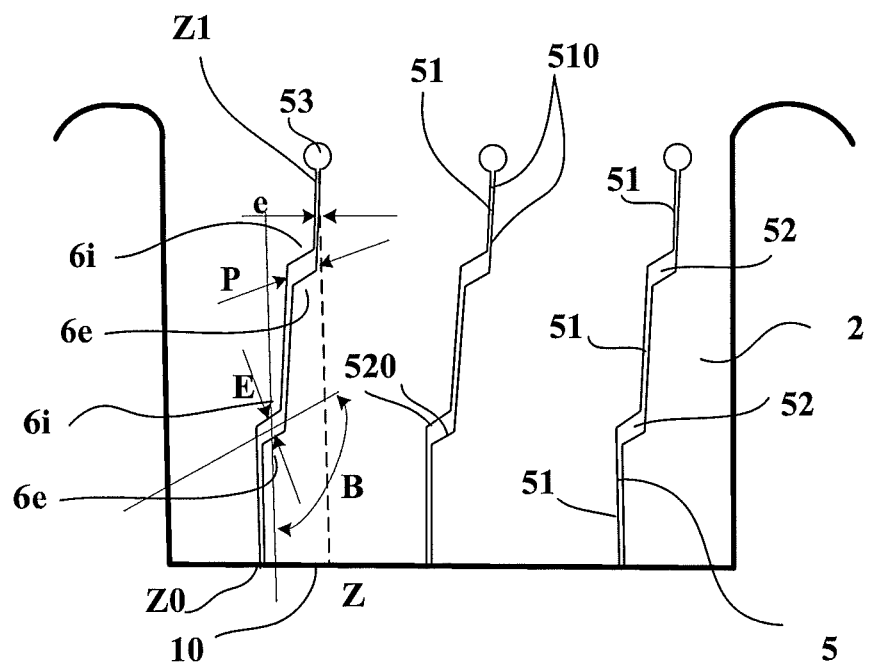
FIG. 2 shows a section in section along the line II-II taken on an element of FIG. 1.

FIG. 2 shows a section along the line II-II made on the tread shown in FIG. 1. This FIG. 2 shows the lines in the sectional plane of the incisions 5. Each incision comprises three thin sections 51 and two thick sections 52, these thin and thick sections being placed alternately going from the running surface 10 to the inside of the tread. The section emerging on the running surface in the new state of the tread is a thin section 51 forming a zero angle with a perpendicular to the running surface passing through the point Z0 of intersection of the incision 5 with the running surface 10 in the plane of FIG. 2. This first thin section emerging on the running surface is extended towards the inside of the tread by a thick section 52 forming an angle B equal to 100 degrees with the direction perpendicular to the running surface as defined above. In the present case, the thick sections make an angle, of 10 degrees with a plane parallel to the running surface so as to extend a thin section towards the inside of the tread. In the example described with FIG. 2, the thin sections all have the same orientation, similarly the thick sections all have the same orientation B. By convention, an angle B equal to 90 degrees corresponds to a direction parallel to the face of contact.

The thin sections 51 are delimited by opposite walls 510 and have a width e less than the width E of the thick sections 52; the width e of the thin sections is such that, when they go through the contact patch, the walls 510 delimiting said thin sections are virtually instantaneously in contact (these same walls 510 can be in contact before even passing into the contact patch particularly in the case of an incision of zero width). In the present case, the thickness e, measured perpendicularly to the walls delimiting the incision on the thin section in question, is 0.3 mm. The width E of the thick sections 52, measured perpendicularly to the walls delimiting the incision on the thick section in question, is greater than that of the thin sections 51 and such that, solely under the action of the supported load, the walls 520 delimiting the thick sections 52 are not in contact. The width E in the present case is 0.8 mm.

The length P of the thick sections is an adjustment parameter available to those skilled in the art for adjusting the size of the incision and also for ensuring correct closing during certain maneuvers. The point Z1 that is innermost in the incision 5 is in this instance formed by a widening 53 that is useful for reducing the concentrations of stress. The thick sections generate corners 6i and 6e of material that can come into contact during a relative movement of the faces delimiting the thin sections. The corners of material 6e are situated on the side of the contact face relative to the corners 6i. This point Z1 has, as a projection onto the contact face of the element, a point Z in the sectional plane of FIG. 2; if the ground exerts on the contact face a force F tangential to this face and oriented in the direction going from the point Z to the point Z0, and after sliding of the opposite faces of the thin sections, the corners 6e rest on the corners 6i thus blocking the deformation of the element.

During a maneuver producing a tangential force of the road surface on the tread, and as a function of the amplitude of this force, this incision provides a mechanical operation that varies depending on whether the force F is below a predetermined threshold of force Fs or above this threshold Fs. Specifically, for forces of between zero and the threshold value Fs, the friction forces resulting from the contacts between the walls 510 of the thin sections 51 are sufficient to resist the relative movement of said walls. For forces F higher than the threshold value, the walls of the thin sections in contact will slide relative to one another thus promoting a larger deformation of the elements of the tread and thereby a better contact with the road surface. This sliding occurs until the walls of the thick sections come into contact with one another thus blocking the relative movements and therefore the deformation of the tread. Therefore, it is possible to manage the mechanical operation of each relief element of the tread by adjusting a priori the value of the threshold Fs as a function of the amplitude of the force in question (driving or braking) that is exerted on a tread notably with consideration given to the vehicle and the running conditions.

Depending on whether the configuration is one of driving force or of braking force, it is possible to obtain force thresholds of different values: under driving force, the threshold beyond which there is sliding of the opposite walls of the thin portions can be greater than the threshold under braking force in order to have sliding.

As has been found, each of these thresholds depends on the limit from which a sliding occurs of the walls of the thin sections against one another. This limit and therefore these force thresholds Fs can be adjusted by virtue of various factors available to those skilled in the art and notably:

the dimensions of the walls in contact;
the coefficients of friction of contact of the walls with one another;
the thickness e of the incision in the thin section (the thinner this incision, the more the threshold Fs is shifted towards higher values).

Beyond the threshold Fs, the walls 510 of the thin sections can therefore slide against one another; the limit of the amplitude of this sliding is substantially equal to the width E of the thick sections 52; this width E is measured parallel to the direction of the thin sections (in the present case in a direction perpendicular to the running surface). This width E is also an adjustment parameter available to those skilled in the art for limiting the amplitude of sliding.

Figure 3:
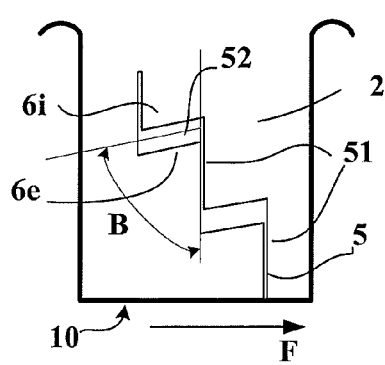
FIGS. 3 to 6 show variants of incisions according to the invention.

The variant of incision 5, shown in section in FIG. 3, comprises three thin sections 51 with a width equal to 0.2 mm oriented perpendicularly to the running surface and two thick sections 52 placed in alternation with the thin sections. In this variant, the thick sections have a width equal to 1 mm and are oriented so as to make an average angle B of 80 degrees with a direction perpendicular to the running surface: in the present case, each thick section extends a thin section and is oriented towards the running surface 10. The formation of external corners 6e and internal corners 6i of material is shown, each external corner 6e being located on the outside (that is to say towards the contact face) relative to an internal corner 6i, so that each external corner 6e can come into contact with an internal corner 6i when the faces of the thin sections slide. This placing in contact is possible for a direction of force F indicated by an arrow in FIG. 3 of the ground on the contact face of the element.

Figure 4:
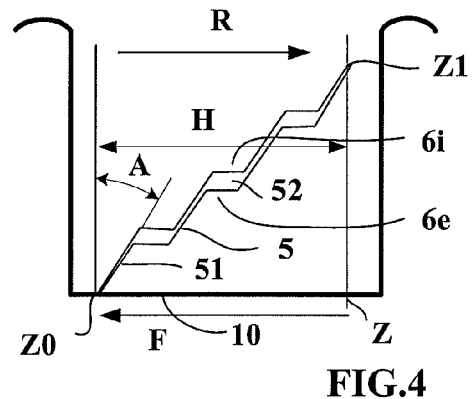

In the variant shown with FIG. 4, the incision 5 comprises thin portions 51 inclined at an angle A relative to a direction perpendicular to the running surface. The direction indicated by the arrow corresponds to the direction of travel R (from right to left in the figure in the present case). The inclination of each thin section is such that the direction joining the point Z obtained as the projection onto the running surface of the innermost point Z1 of the tread and the outermost point Z0 on the running surface is opposite to the direction of travel R. In this variant, the thin sections 51 are inclined at an angle A equal to 30 degrees with a direction perpendicular to the running surface 10. The thick sections 52 are substantially parallel to the running surface. The difference in thickness between the thick sections 52 and the thin sections is in this instance greater than 0.3 mm. In this variant, during a braking phase, the thin sections are closed and beyond a braking force threshold indicated by the arrow F, the opposite faces of these sections will be able to slide against one another until the external corners 6e come into contact with the internal corners 6i (the external corners 6e being situated towards the contact face of the element relative to the internal corners 6i).

Figure 5:
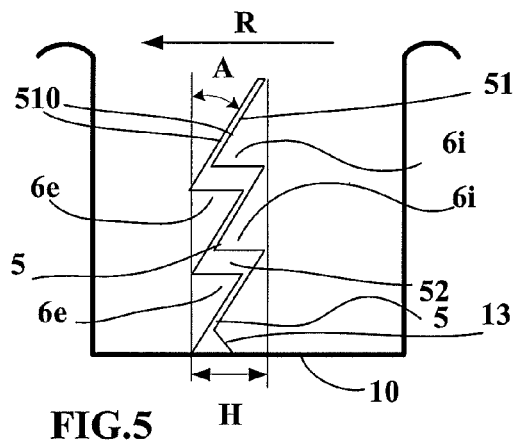

The variant shown with FIG. 5 is substantially equivalent to that shown with FIG. 4, the only difference lying in the arrangement of the various sections of incision relative to one another. Specifically, in this variant of FIG. 5, the length H occupied by the incision 5 in the tread corresponds to the length of the perpendicular projection of each of the various thin and thick sections of the running surface 10, while in the variant of FIG. 4 this same length H was equal to the total of said projections, that is to say to the distance separating the points Z and Z1. In this variant shown with FIG. 5, the thin sections are inclined at an angle A equal to 30 degrees with a direction perpendicular to the running surface and the thick sections are parallel to the running surface. In this variant of FIG. 5, external corners 6e and internal corners 6i are formed, each of said corners being formed by a face of a thin section and a face of a thick section. An external corner 6e is designed to interact by contact with an internal corner 6i on an opposite face of the incision 5.

Moreover, the variant shown with FIG. 5 comprises a bevel 13 of 1 mm by 1 mm on the side (that is to say forming an angle equal to 45 degrees with a perpendicular to the running surface) on the trailing edge formed by the incision on the contact face in order to reduce at least in the first kilometers of running the wear located on the trailing edge of the incision as defined by the present invention. By definition, an incision cuts the running surface along a leading edge (the first to enter the contact patch on one and the same element) and a trailing edge (the last to leave the contact patch).

Figure 6:
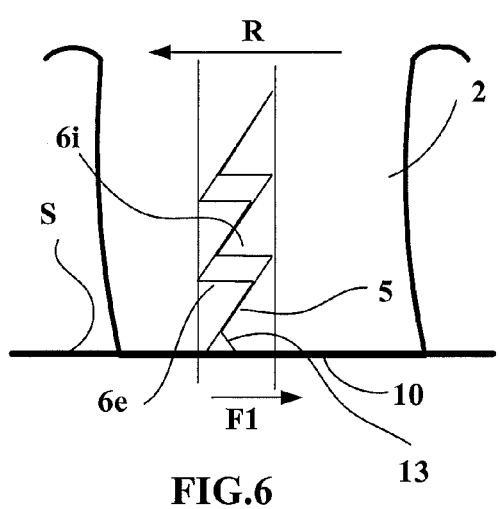
Figure 7:
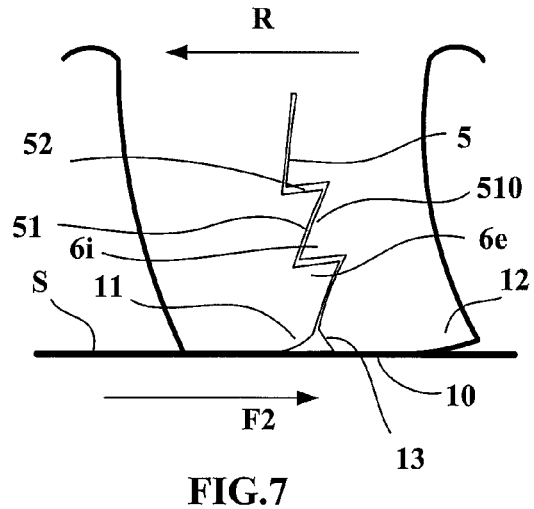
FIG. 7 shows operation of the strip at FIG. 5 during a braking maneuver.

FIGS. 6 and 7 show the operation of the strip shown with FIG. 5 during two braking maneuvers (different amplitudes of force). The tire is running on a ground S.

Under the action of the load supported by the tire, the incision is closed by the walls 510 of the thin sections 51 being placed in contact. In a first braking maneuver, shown with FIG. 6, it involves ceasing to accelerate the vehicle by lifting the foot from the accelerator pedal. In this maneuver, an overall braking force F1 of low amplitude that virtually does not modify the conditions of closure of the incision. In this braking maneuver of the vehicle moving from right to left in the figure (in the direction of the arrow R), the force F1 exerted by the road surface on the tire tends to resist the movement: this force F1 is consequently directed from left to right of the figure. In this maneuver, everything happens as if the block had a rigidity similar to that of a block with no incision. This is favorable for reducing the wear of the tread. In this first braking maneuver, the internal and external corners are not in contact and cannot come into contact.

In a second braking maneuver—shown with FIG. 7—following the first braking maneuver, the driver uses the brake pedal to actually brake his vehicle. In this braking maneuver of the vehicle moving from right to left in the figure (the direction of the arrow R), the force F2 exerted by the road surface on the tire tends to resist the movement: this force F2 is consequently directed from left to right in the figure. This force F2 tends to want to straighten the inclined thin sections of the incision, that is to say to make them turn in order to bring them closer to the direction perpendicular to the running surface 10. When this force F2 becomes greater than the threshold Fs of force causing the walls 510 of the thin sections 51 to slide, there is a sliding and relative movement of the walls 510 of the thin sections 51 relative to one another which makes possible a greater deformation by tilting of said element in order to ensure a good grip performance on the road surface notably on a wet road surface.

It can be seen that in this second braking maneuver the external corners 6e are brought closer to the internal corners 6i. If the braking force increases, these external and internal corners come into contact in order then to limit the deformation of the element 2 of the tread.

In this braking maneuver imposing a braking force higher than the threshold Fs, it is found that, by virtue of the sliding movements of the walls of the thin sections of the incision 5, a kind of local raising of the leading portions 11, 12 of the block 10 occurs. One of said leading portions corresponds to the leading edge of the block and the other corresponds to one of the edges formed by the incision 5 in the block. By virtue of these local raising actions, the average pressure of contact of the block with the road surface increases which results in improved grip on water-covered ground.

On dry ground, the braking forces are usually greater in amplitude and lead to the walls of the thick sections being placed in contact: by virtue of this contact, it is possible to obtain good grip performance even on dry ground.

Contrary to the braking force, the application of a driving force tends to accentuate the closure of the incisions on the thin sections by a substantial increase in the contact pressure that one wall exerts on the opposite wall on these same thin sections. This makes it possible to prevent the relative sliding between the walls of the thin incisions and consequently gives the sculpture a high rigidity under driving force (that is to say a sculpture close to a sculpture with no incision), a guarantee of good wearing performance.

The invention is not restricted to the examples described and shown and various modifications can be made thereto without departing from its context. The incision according to the invention that has been shown in blocks can be applied in ribs. It is possible notably to combine thin sections of different orientations in one and the same incision. It is also possible to combine in one and the same incision thick sections having different inclinations, that is to say that each section has an inclination specific to it. It is also possible to combine thin sections and/or thick sections of different depths and of different widths. For example, it is possible to employ an incision according to the invention in which the thick sections each have a specific thickness, the last thick section having the greatest thickness.

The invention claimed is:

1. A tread for a passenger-vehicle tire, this tread having radially on the outside a running surface designed to come into contact with the road surface when running, this tread comprising a plurality of elements delimited by cutouts, at least certain of these elements being provided with at least one incision delimited by two opposite faces, this incision consisting of a succession of thin sections and of thick sections placed in an alternating manner, wherein each thin section is inclined at an average angle A equal to no more than 40 degrees, this angle being measured relative to a direction perpendicular to the running surface of the tread and passing through the points of the incision on the running surface of the tread, wherein each thick section makes an average angle B of between 60 degrees and 120 degrees with a direction perpendicular to the running surface of the tread, and wherein the thin sections have a width e less than the width E of the thick sections, the width of the thin sections being such that, when they go through the contact patch, the walls delimiting the thin sections are in contact, and the width of the thick sections being such that, when they go through the contact patch, the walls delimiting the thick sections are not in contact;
wherein the thin sections of incision have a width equal to no more than 0.4 mm, and wherein the thick sections of incision have a width of more than 0.4 mm, the difference between the widths of the thin sections and of the thick sections being at least equal to 0.2 mm.

2. The tread according to claim 1, wherein the thin sections of incision have a width equal to no more than 0.15 mm and wherein the thick sections of incision have a width of more than 0.4 mm.

3. The tread according to claim 1, wherein it has an imposed running direction and wherein it further comprises an indicator of this running direction, and wherein at least one incision comprises at least one thin section and one thick section, the thin sections being inclined so that, seen in section in a plane perpendicular to the rotation axis of the tire, the direction of the indicator of the imposed running direction is identical to the rotation direction in which said thin section of incision must be made to rotate about its innermost point of the tread in order to bring this thin section into a plane containing the rotation axis, the thin sections being inclined at an angle A at least equal to 20 degrees and equal to no more than 40 degrees with a direction perpendicular to the running surface.

4. The tread according to claim 1, wherein each incision cuts the running surface in order to form a leading edge and a trailing edge, and wherein the trailing edge comprises a bevel.

5. The tread according to claim 2, wherein it has an imposed running direction and wherein it further comprises an indicator of this running direction, and wherein at least one incision comprises at least one thin section and one thick section, the thin sections being inclined so that, seen in section in a plane perpendicular to the rotation axis of the tire, the direction of the indicator of the imposed running direction is identical to the rotation direction in which said thin section of incision must be made to rotate about its innermost point of the tread in order to bring this thin section into a plane containing the rotation axis, the thin sections being inclined at an angle A at least equal to 20 degrees and equal to no more than 40 degrees with a direction perpendicular to the running surface.

6. The tread according to claim 4, wherein it has an imposed running direction and wherein it further comprises an indicator of this running direction, and wherein at least one incision comprises at least one thin section and one thick section, the thin sections being inclined so that, seen in section in a plane perpendicular to the rotation axis of the tire, the direction of the indicator of the imposed running direction is identical to the rotation direction in which said thin section of incision must be made to rotate about its innermost point of the tread in order to bring this thin section into a plane containing the rotation axis, the thin sections being inclined at an angle A at least equal to 20 degrees and equal to no more than 40 degrees with a direction perpendicular to the running surface.

* * * * *